US006616035B2

(12) United States Patent
Ehrensvärd et al.

(10) Patent No.: US 6,616,035 B2
(45) Date of Patent: Sep. 9, 2003

(54) METHOD AND DEVICE FOR IDENTIFICATION AND AUTHENTICATION

(75) Inventors: Jakob Ehrensvärd, Täby (SE); Stina Grip, Täby (SE)

(73) Assignee: Cypak AB, Täby (SE)

( * ) Notice: Subject to any disclaimer, the term of this patent is extended or adjusted under 35 U.S.C. 154(b) by 0 days.

(21) Appl. No.: 10/145,951

(22) Filed: May 15, 2002

(65) Prior Publication Data

US 2002/0170960 A1 Nov. 21, 2002

Related U.S. Application Data

(63) Continuation of application No. 09/507,087, filed on Feb. 18, 2000.

(51) Int. Cl.[7] .................................................. G06K 5/00
(52) U.S. Cl. ...................... 235/380; 235/379; 235/381; 235/383; 705/39; 705/41; 705/43; 705/44; 902/1; 902/2; 902/4; 902/5; 902/22; 902/25
(58) Field of Search ............................... 235/380, 379, 235/381, 383, 487, 492; 705/39, 41, 42, 43, 44; 902/1, 2, 4, 5, 22, 24, 25

(56) References Cited

U.S. PATENT DOCUMENTS

| | | | |
|---|---|---|---|
| 4,001,550 A | 1/1977 | Schatz | 235/61.7 B |
| 4,023,012 A | 5/1977 | Ano et al. | 235/61.7 B |
| 4,092,524 A | 5/1978 | Moreno | 235/487 |
| 4,211,919 A | 7/1980 | Ugon | 235/487 |
| 4,295,039 A | 10/1981 | Stuckert | 235/380 |
| 4,302,810 A | 11/1981 | Bouricius et al. | 235/379 |
| 4,453,074 A | 6/1984 | Weinstein | 235/380 |
| 4,523,087 A | 6/1985 | Benton | 235/379 |
| 4,614,861 A * | 9/1986 | Pavlov et al. | 235/380 |
| 4,701,601 A | 10/1987 | Francini et al. | 235/380 |
| 4,758,718 A | 7/1988 | Fujisaki et al. | 235/487 |
| 4,766,293 A | 8/1988 | Boston | 235/379 |
| 4,839,506 A | 6/1989 | Homma et al. | 235/379 |
| 4,864,109 A | 9/1989 | Minematsu | 235/379 |
| 4,876,535 A | 10/1989 | Ballmer et al. | 235/380 |
| 4,879,455 A | 11/1989 | Butterworth et al. | 235/492 |
| 5,530,232 A | 6/1996 | Taylor | 235/380 |
| 5,590,038 A | 12/1996 | Pitroda | 235/380 |

(List continued on next page.)

FOREIGN PATENT DOCUMENTS

| | | |
|---|---|---|
| EP | 0251619 | 1/1988 |
| EP | 1061482 A1 | 12/2000 |
| GB | 2275654 | 9/1994 |
| WO | 9624112 | 8/1996 |

OTHER PUBLICATIONS

Personal Transaction Card, Aug. 1987, IBM Technical Disclosure Bulletin, US, vol. 30, Issue 3, pp. 1262–1265.*

*Primary Examiner*—Thien M. Le
*Assistant Examiner*—Uyen-Chau Le
(74) *Attorney, Agent, or Firm*—Renner, Otto, Boisselle & Sklar, LLP

(57) ABSTRACT

A method and a device of identification and authentication of a holder of a mobile electronic transaction device in an electronic transaction process between a transaction service provider and a transaction terminal in communication via a computer network. A transceiver is adapted for transmitting an identity of the device to the transaction terminal and receiving a challenge transaction identifier from the service provider via the transaction terminal. A data processing device is adapted for determining an authenticity of a user identification input by comparison with a reference user identification, and for performing a cryptographic transformation of the transaction identifier using a secret key only on the identification input being determined as authentic. The transceiver is also adapted for transmitting a response result of the cryptographic transformation to the service provider via the transaction terminal for validating the transaction.

8 Claims, 5 Drawing Sheets

U.S. PATENT DOCUMENTS

| | | | |
|---|---|---|---|
| 5,623,552 A | 4/1997 | Lane | 235/492 |
| 5,748,737 A | 5/1998 | Daggar | 235/380 |
| 5,847,447 A | 12/1998 | Rozin et al. | 235/457 |
| 5,884,271 A * | 3/1999 | Pitroda | 705/1 |
| 5,907,142 A | 5/1999 | Kelsey | 235/380 |
| 5,955,961 A | 9/1999 | Wallerstein | 235/380 |
| 6,047,888 A | 4/2000 | Dethloff | |
| 6,286,099 B1 * | 9/2001 | Kramer | 713/172 |

\* cited by examiner

METHOD AND DEVICE FOR IDENTIFICATION AND AUTHENTICATION

RELATED APPLICATION DATA

This application is a continuation of Ser. No. 09/507,087, filed Feb. 18, 2000, which is hereby incorporated herein by reference in its entirety.

FIELD OF THE INVENTION

The present invention relates to a method and a device for performing secure transactions between a service provider such as an institution, a bank, financial institute, retail store, database server, file server etc., and a holder of the device, i.e. transaction requester, which can be a customer or a user of a system.

BACKGROUND OF THE INVENTION

When performing transaction and identification in a general form (credit cards, club members, fund members, broker contacts, access control etc.) a customer or user identifies itself by supplying a unique person identifier, such as a name, customer number, credit card number, social security number etc. The transaction can either be accepted or require further authentication, such as supplying a secret piece of information such as a password or a PIN(Personal Identification Number)-code. If a lookup in the customer/user file identifies the authentication response as correct, the transaction is considered valid. In the case of authentication being used, the problem addressed is the fact that the service provider can by no means verify that the user is the person it turns out to be.

Several problems arise in terms of security, since this type of processing often is done over "open air", i.e. it can be intercepted and recorded. The fraudulent user can then supply the same identity and authentication and to the service provider appear to be the legal user. To supply a credit card number over a phone connection or on a fax-back form is a large discomfort for many users. Further on, fraudulent use of personal codes and credit card numbers is a major problem in today's automated world.

The growth of Internet trade has risen several concerns about security when customers have to identify themselves to a remote service provider. There is a general understanding that a severe limiting factor for the public to perform trade and utilize services is the rational fear that confidential information is intercepted during transmission of account numbers and credit card numbers having corresponding passwords or PINs.

There are several methods and devices which address these concerns, including encryption of secure information and Transaction Identification (TID) codes. The latter relates to the method of the Service Provider (SP) issuing a single-use code which is transformed in a non-linear fashion, unique to each user, and then transferred back to the SP. The SP then performs the same non-linear transformation and compares the result returned from the remote location. If the results match, the transaction is considered to be valid.

A common way of performing secure transaction relies on the concept of a Certificate, such as X.509, which is defined as an open standard. The certificate relies on the concept of TIDs and is issued by the SP. The certificate is a piece of information, installed into the software package used to perform transactions, such as an Internet browser. The user activates the secret information in the certificate by providing a PIN-code, which is compared with the predefined code in the certificate.

The certificate method has several drawbacks, where the most obvious is the fact that the certificate resides in one computer only. There is no general way of carrying a certificate from computer to computer, or in a more general form, from terminal to terminal. There is also a security drawback involved in the fact that the certificate is stored on a non-removable medium, and can therefore theoretically be opened by someone else using the computer where the certificate is stored.

The fact that scripting languages, such as Java and VBScript, commonly used to perform a more programmatic behavior of Internet pages, actually can perform fraudulent actions, such as intercepting the PIN-code entered when opening a certificate, copying the certificate information and then transferring he information back to an alien service provider.

Some SPs issue transaction terminals, which are small calculator-like devices including a display, a keyboard, and in some cases a slot for inserting an IC-card with user information. This method solves the problem with mobility, but adds up an additional cost for the device. The most severe drawback of this method is the fact that it is all done manually. To enter a TID, and then collate the processed result back is a time-consuming and error-prone process. The number of digits entered and collated back has to be a compromise between security on one hand, and the convenience of having a short code on the other. It can further be assumed that these manual steps are an obstacle for the customer, which may be one reason not to perform a desired action.

The concept of encryption generally relies on the assumption that the time required to "reverse engineer", i.e. decrypt, the encrypted information is long enough to make it practically impossible to even try to break the encryption scheme. The fabulous growth of both computer processing power and the discovery of new mathematical algorithms have in many cases proven that this assumption is dangerous. Reverse engineering actions, once considered to take several years on the most powerful machine available, can now be performed in minutes by implementation of new algorithms and massive computing power.

Encryption methods, such as Data Encryption Standard (DES), previously known as hard-to-break schemes are now considered "weak". Prime number methods, such as RSA, try to keep ahead of this leap by making longer and longer keys. 56-bit RSA methods are today known to be considerably safe, but some high-security applications rely on 1024-bit numbers. This race of numbers can be expected to continue.

A problem with high-security encryption schemes is the fact that they usually need heavy numerical processing. By stationary devices, equipped with high-performance microprocessors, such a PC, this is generally not a major problem. But battery operated, low cost mobile devices, such as cellular phones, portable notebooks etc., generally have limited resources for numerical processing.

The conclusion is that it would be advisable to provide a method and device of addressing these issues and be able to practically prove beyond doubt that a transaction is secure. Preferably, the scheme should be simple to explain and not rely on the fact that parts of the method must be kept strictly secret.

OBJECT OF THE INVENTION

An object of the present invention is to provide a method and a device which is capable of performing a secure transaction automatically over a data network as soon as the transaction requester has entered a valid personal identification in the device.

SUMMARY OF THE INVENTION

According to one aspect of the invention there is provided a method of identification and authentication of a holder of a mobile electronic transaction device in an electronic transaction process between a transaction service provider and a transaction terminal in communication via a computer network, said mobile transaction device comprising transceiver means for transmitting information to and receiving information from said transaction terminal, data input means, data processing means, data storage means having information stored therein including an externally accessible device identity, a non-retrievable reference user identification, and including a non-retrievable secret key to be processed by said processing means and used in communication with the service provider by said transceiver means over said network via the transaction terminal for validating a transaction, and means supplying electric energy to the device, said method comprising:

transmitting the device identity to the transaction terminal;

transmitting a challenge transaction identifier to the device;

said holder entering a user identification input using said input means;

said processing means determining an authenticity of said identification input by comparison with said reference user identification; and only on said identification input being determined as authentic:

said processing means performing a cryptographic transformation of the transaction identifier using said secret key; and transmitting a response result of said cryptographic transformation to the service provider via said transaction terminal for validating said transaction.

According to another aspect of the invention there is provided a mobile electronic transaction device for identification and authentication of a holder of the device in an electronic transaction process between a transaction service provider and a transaction terminal in communication via a computer network, said mobile transaction device having contained therein:

transceiver means for transmitting information to and receiving information from said transaction terminal, data input means, data processing means, data storage means for storing information including an externally accessible device identity, a non-retrievable reference user identification, and including a non-retrievable secret key to be processed by said processing means and used in communication with the service provider by said transceiver means over said network via the transaction terminal for validating a transaction, and means supplying electric energy to the device; wherein said transceiver means being adapted for transmitting the device identity to the transaction terminal and receiving a challenge transaction identifier from the service provider via the transaction terminal;

said processing means being adapted for determining an authenticity of a user identification input by comparison with said reference user identification, and for performing a cryptographic transformation of the transaction identifier using said secret key only on said identification input being determined as authentic; and said transceiver means also being adapted for transmitting a response result of said cryptographic transformation to the service provider via said transaction terminal for validating said transaction.

The transaction device according to the invention has preferably the size of a credit card and is adapted to communicate with a service provider (SP) over a data network, particularly the Internet, via a transaction terminal (TT) having a communication interface such as a card reader (CR).

The SP is a bank, Internet store, retail store etc. The SP keeps a database of all customers authorized to perform transactions. The TT is a stationary device, connected to the SP via a network. The connection can either be continuous or intermittent. The TT can either be specially designed for the purpose or be a standard personal computer. The CR connected to the TT contains a transceiver for bi-directional communication with the device. The card preferably is a low-cost device which is carried by the card holder, i.e. the customer. The card can actively perform data exchange with the TT using the CR. In the preferred embodiment the data exchange is performed by wireless close-proximity capacitive data transmission and power supply for the card.

DESCRIPTION OF THE PREFERRED EMBODIMENT

A preferred embodiment of a mobile low-cost electronic transaction device is shown in FIGS. 1 through 5.

The device has the external shape of a card 10, preferably a credit card, and is optionally provided with a magnetic strip (not shown) and an embossed text field to be allowed for use as a conventional credit card. However, a transaction device according to the invention may have other shapes, for example the shape of a small calculator.

Figure 1:
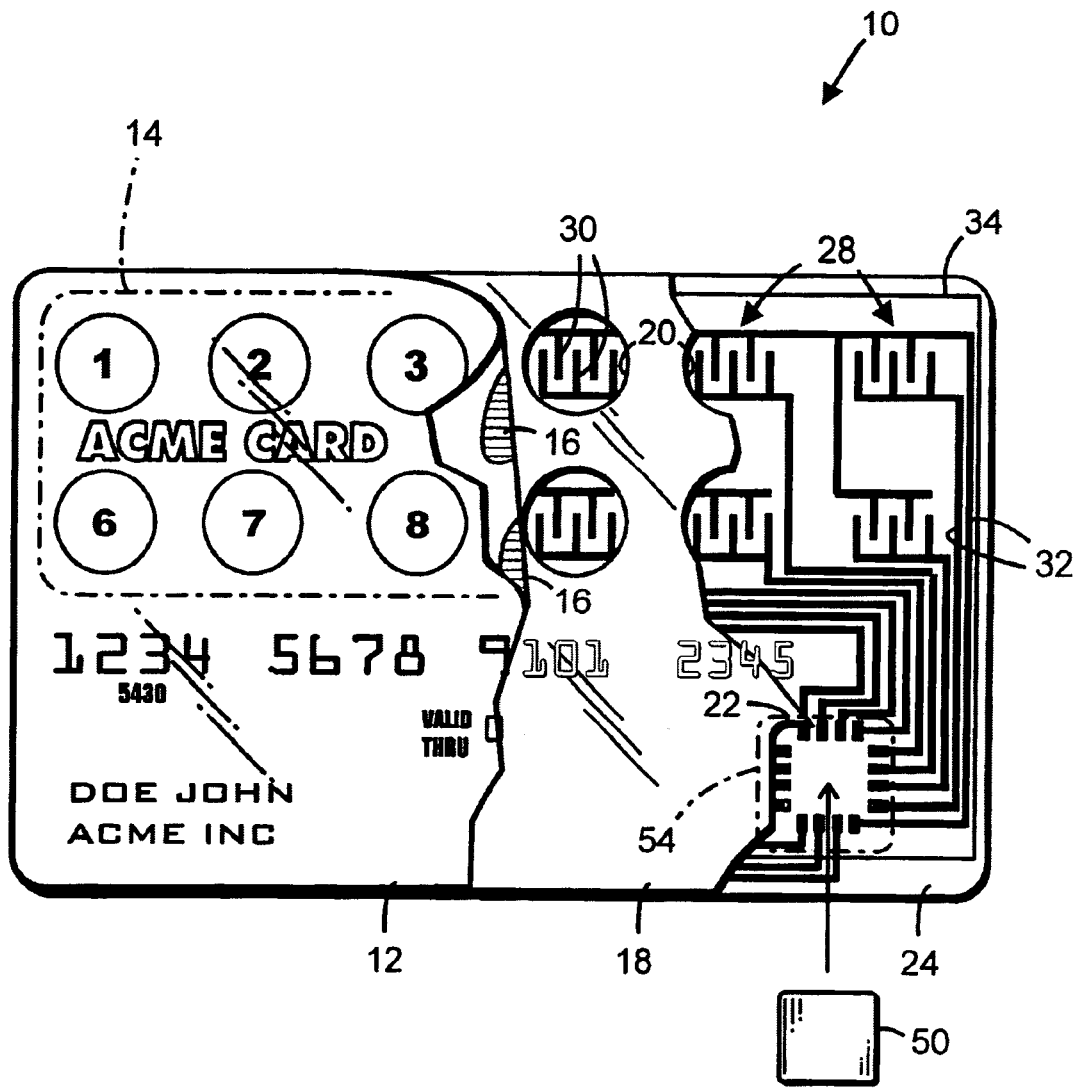
FIG. 1 is a front view with parts broken away of a transaction card according to the invention.

As is apparent from FIG. 1, the card 10 is preferably composed of three laminated sheets 12, 18, 24, preferably of polyester plastics material and having a combined thickness of about 0.8 mm, i.e. the thickness of the conventional credit card.

In the preferred embodiment the card is provided with input means including a keypad 14, data storage and processing means including an integrated circuit (IC) 50, and transceiver/energy supply means including a capacitive transceiver or bi-directional transmitter 38, parts of which are shown in FIGS. 6 through 9.

The keypad 14, which is suitably located at an upper part of the card front face has twelve keys for manual entry of numbers 0–9 as well as "Enter" and "Clear" commands. The keypad 14 is preferably a membrane-type keypad which is embedded in the card 10. More precisely, the thin resilient polyester plastic material of the top sheet 12, having printed key symbols on its front face, constitutes the keypad key membranes. On the bottom inside face of the top sheet 12 electrically conductive switch pads 16 are printed. The intermediate sheet 18 functions as a spacing layer having circular recesses 20 in register with the switch pads 16 and also having a rectangular recess 22 housing IC 50. The bottom sheet 24 has an uppermost printed circuit layer 26 (se also FIG. 4) including switch areas 28 in register with the switch pads 16 and the circular recesses 20. The arrangement is such that when a cardholder presses a key on the keypad 14, the corresponding conductive switch pad 16 overbridges the space of about 0.5 mm formed by the corresponding recess 22 and comes into contact with a registering switch area 28. A corresponding electric circuit 32, which is normally broken by a dense pattern of conductors 30 camming into each other in the switch area 28, is thereby closed. Each electric circuit 32 is connected to the IC 50 via printed connector patches of a connecting interface 54.

Figure 5:
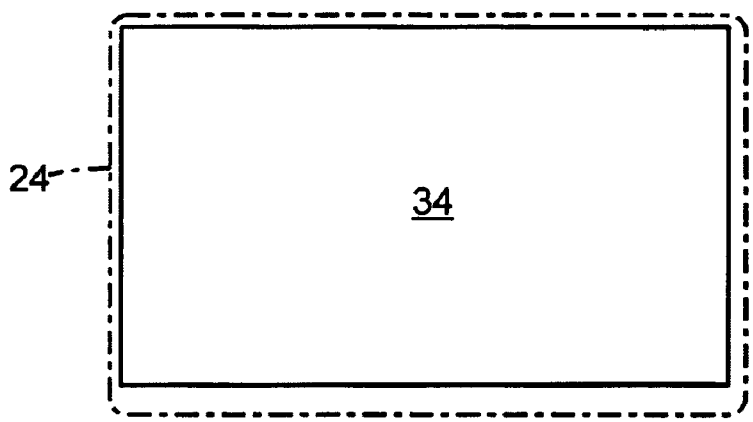
FIG. 5 shows a second layer printed onto the first layer of the bottom lamina and including an insulating patch.
Figure 6:
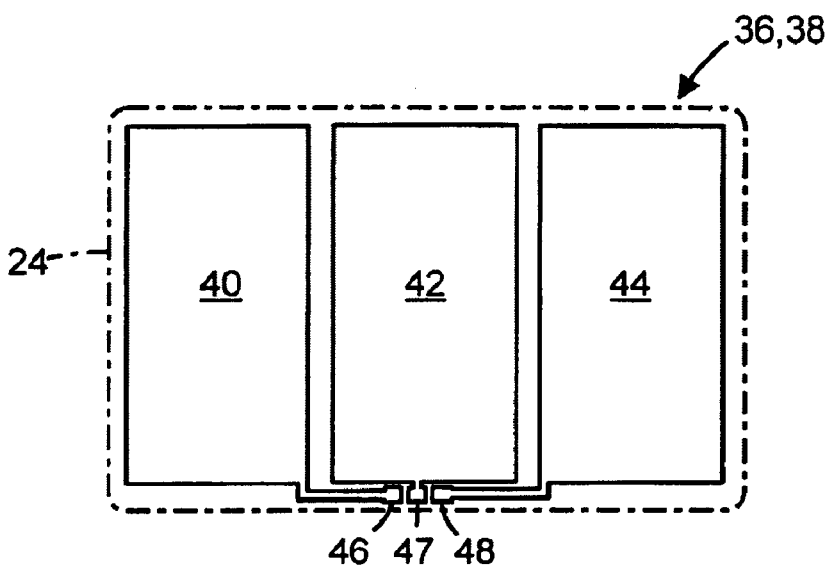
FIG. 6 shows a third layer printed onto the second layer of the bottom lamina and including electric circuits.

As mentioned above, the printed circuit layer 26 forms a top layer in the bottom sheet 24. As indicated in FIGS. 5 and 6, the inside of the bottom sheet 24 has two underlying additional printed layers, namely a printed electrically insulating intermediate layer 34 and a printed capacitive bottom layer 36. The bottom layer 36, which forms a part of the capacitive transceiver 38 (FIG. 9) to be later described, comprises three capacitive patches 40, 42, 44 which are electrically connected to the IC 50 via printed connector patches 46, 47, 48. These are in turn connected to connector patches 56, 58, 58 of the connecting interface 54 (FIG. 4) when the top circuit layer 26 is printed onto the insulating intermediate layer 34.

In a manner well known in the art, the IC 50 has data storage, processing and input/output means designed for the particular purpose and for use of the card as a transaction device. Particularly, the storage means is capable of storing therein a Personal Identification code (PIN) of typically four digits and a Secret Key (SK) of a considerably length. The PIN and the SK which preferably are already stored in the memory when the card is issued to the holder can by no means be retrieved from the card 10. The SK is programmed one time only into the card by the card issuer. In a manner well known per se in the art of microelectronics, software and/or hardware means are adapted to prevent readout and altering of the PIN and the SK. The PIN may, however, optionally be altered once from a pre-programmed initial value by the holder before using the transaction card 10.

Figure 2:
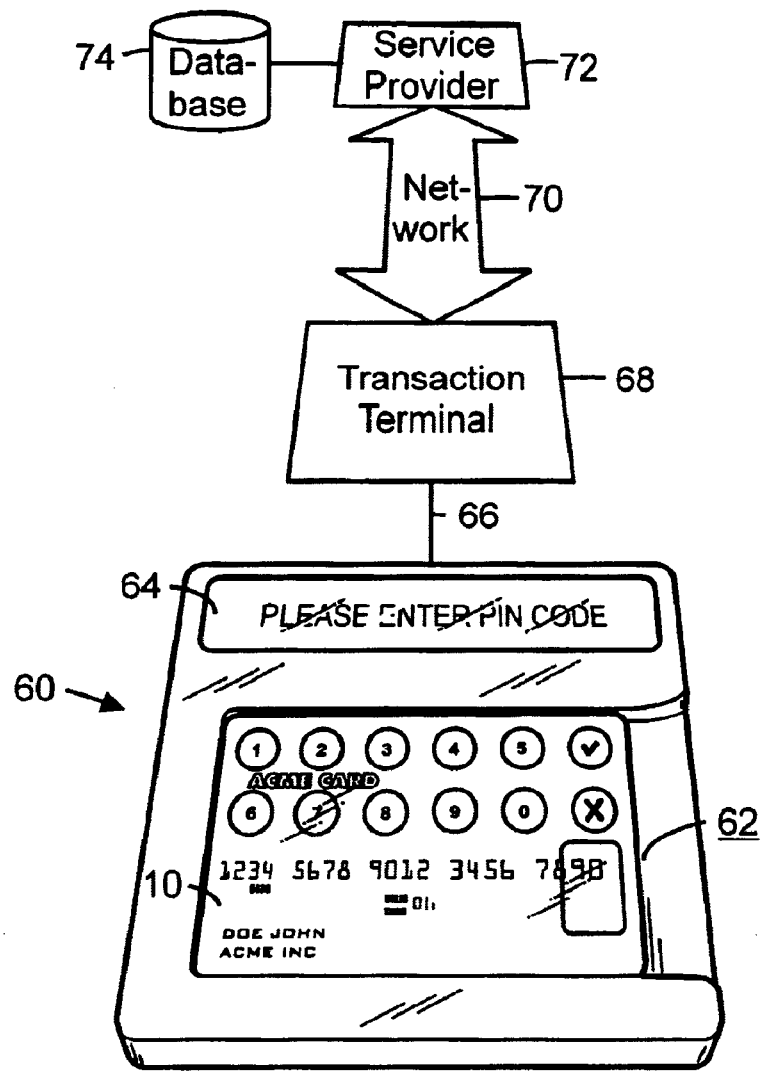
FIG. 2 is a diagrammatic view showing a transaction card according to FIG. 1 in communication with a service provider in a network.

FIG. 2 shows a transaction card 10 ready for use, placed on a Card Interface (CI) comprising a capacitive close proximity transceiver in the shape of a card reader 60 by a cable 66.

The card reader 60 has a card-receiving surface 62 onto which the card 60 is placed on validating a transaction with a Service Provider (SP) 72 communicating with the card reader via a network 70 and a Transaction Terminal (TT) 68 connected to the card reader 60. The shown card reader 60 has also an alphanumeric display 64 for prompting necessary actions during a transaction process.

Figure 3:
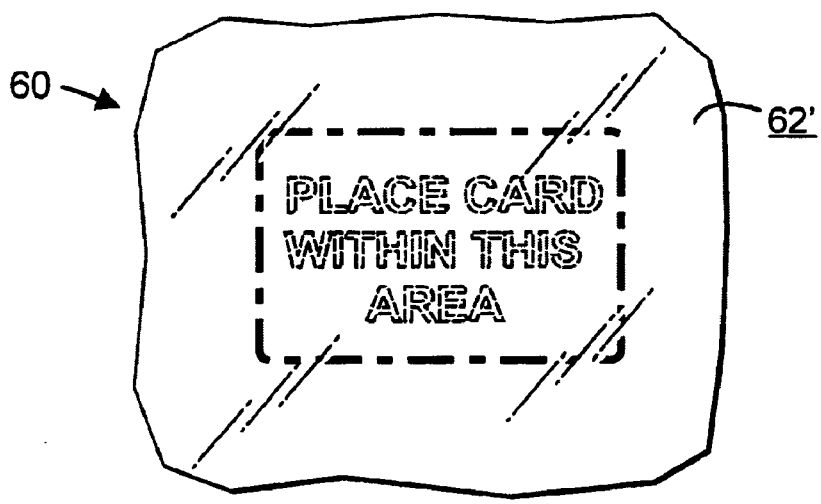
FIG. 3 is a front view with parts broken away of a flat panel having a card transaction terminal embedded in the panel structure.
Figure 4:
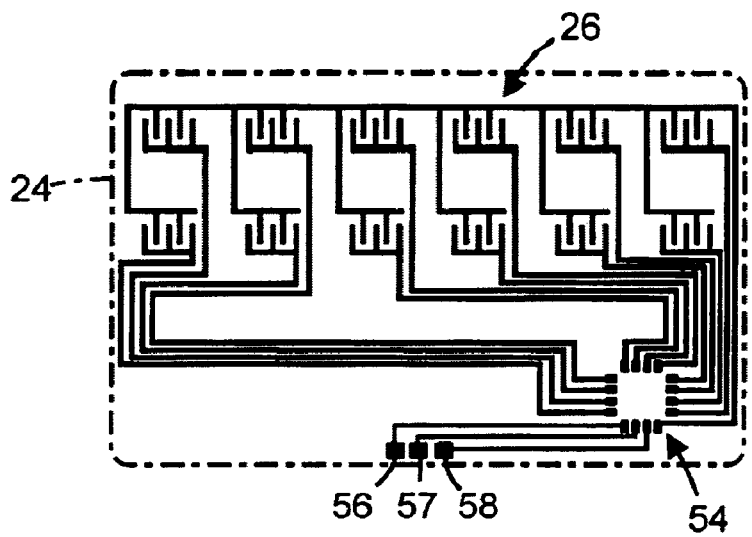
FIG. 4 shows a first layer printed onto a bottom lamina of a transaction card according to the invention and including capacitive conductor patches.

As the transaction device according to the invention is independent of an external keypad, the card reader circuitry can be embedded behind a flat surface 62' as illustrated in FIG. 3. For example, the surface 62' can be a hygienic easy-to-clean glass counter top surface in a store. In that case, the electrically conducting circuitry, including the capacitive areas, can be almost invisibly applied, for example on an inner surface of a glass sheet lamina, by deposition of an Indium-Tin Oxide (ITO) circuit pattern. The flat surface 62' can also be a vertical panel face of a rugged outdoor structure which is unsusceptible to occasional vandalism.

The SP 72 is a bank, Internet store, retail store etc. The SP 72 keeps a record in a database 74 of all customers valid to perform transactions.

The TT 68 is a stationary device, connected to the SP via a network. The connection can either be continuous or intermittent. The TT 68 can either be specially designed for the purpose or be a standard personal computer.

The transceiver of the card reader 60 is capable of bi-directional communication with cards. The card reader 60 is shown as a stand-alone device but can also be an integral part (not shown) of the TT 68.

The card can perform data exchange with the TT using the CI/card reader 60. As mentioned above, in the preferred embodiment said data exchange is performed by wireless means using close-proximity capacitive data transmission and power supply for the card.

Figure 7:
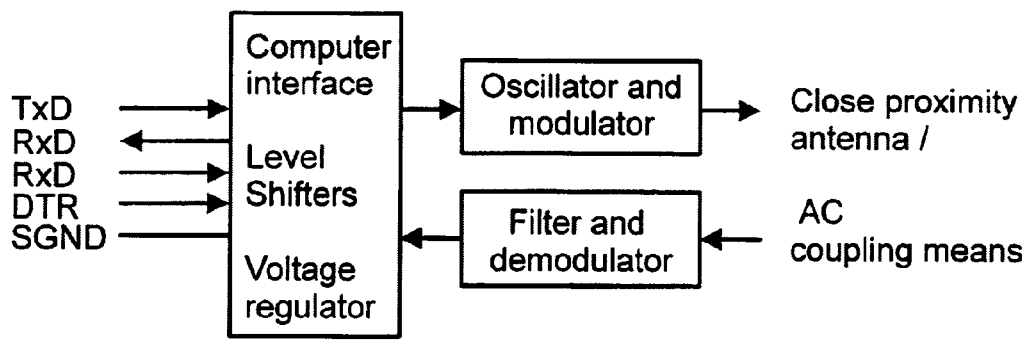
FIG. 7 is a functional diagram of a transaction terminal according to the invention.
Figure 8:
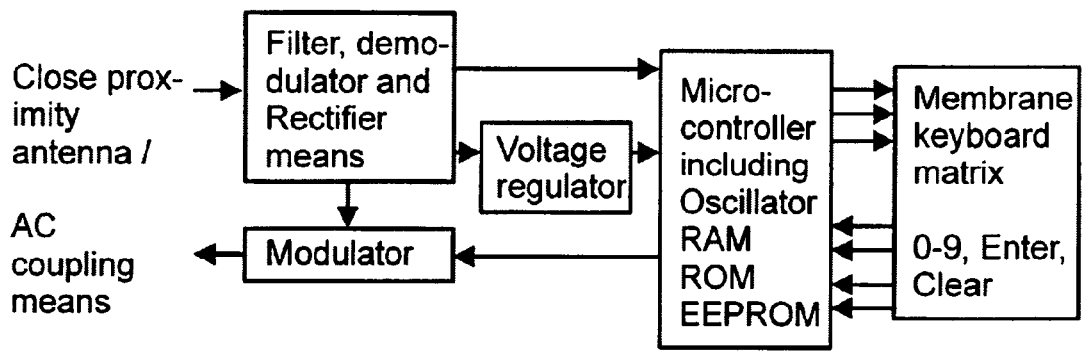
FIG. 8 is a functional diagram of a transaction device according to the invention.
Figure 9:
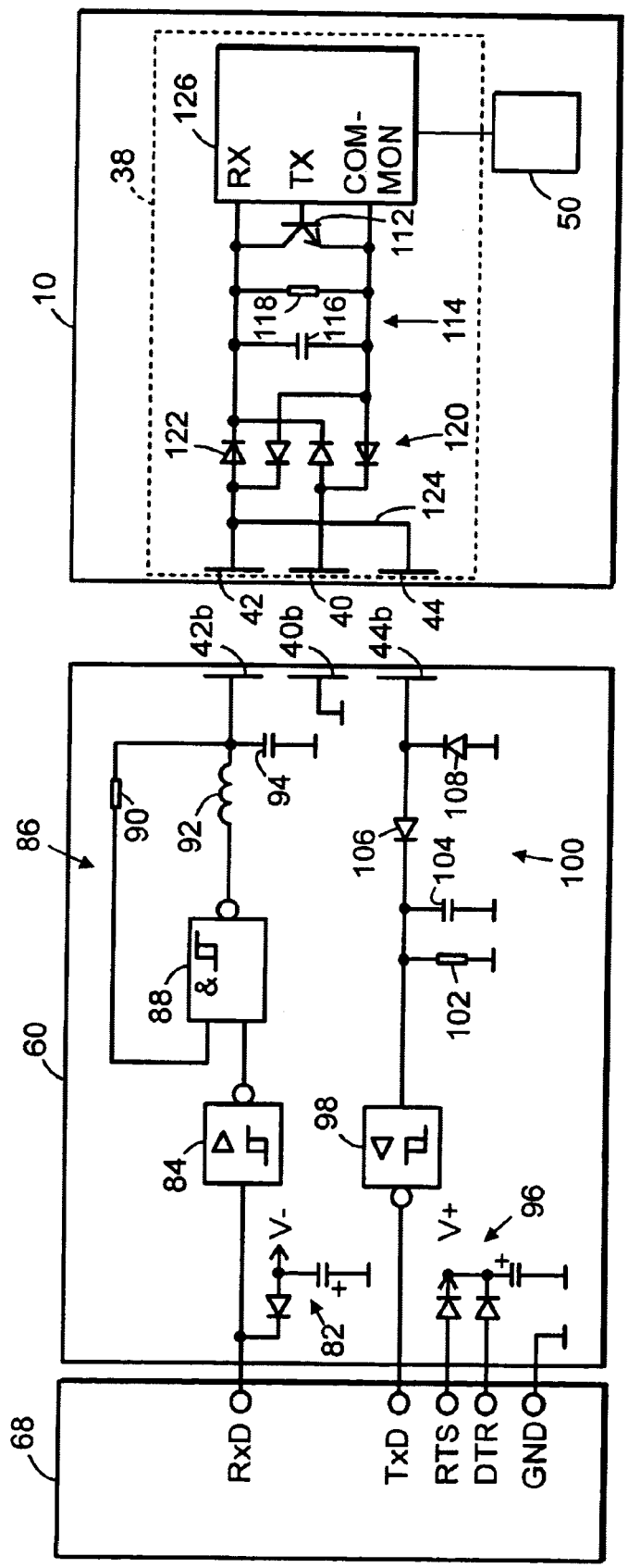
FIG. 9 is a block and circuit diagram of a system including a transaction terminal and a transaction device according to the invention.

FIGS. 7 and 8 show diagrammatic, functional arrangements of respectively a card reader 60 and the card/transaction device 10, whereas FIG. 9 shows specific components of the combined system.

As indicated in FIG. 9, the capacitive patches 40, 42, 44 of the card 10 will come into registration with corresponding capacitive patches 40b, 42b, 44b facing the patches 40, 42, 44 in close proximity when the card 10 is located on the receiving surface 62 (FIG. 2). The card 10 and the card reader 60 will then form the capacitive circuitry shown in FIG. 9 which is capable of supplying electric power to the circuitry of the card 10 and exchanging digital data between the card 10 and the card reader 60 as follows:

In the following description the card reader is regarded as an external host unit 60 sharing a capacitive interface in close proximity to the card 10 regarded as a guest unit and including the integrated circuit 50 connected via an interface 126. The three pairs of conductive areas 40–40b, 42–42b, and 44–44b form the common capacitive interface.

The transaction terminal 68, which can be a standard personal computer, is typically equipped with a V.24/V.28 interface as a standard. The transaction terminal 68 is equipped with a proprietary software driver (not shown) to control the data flow for the host unit 60. Depending on the desired functionality, this driver can either be an installed driver module or a part of an application program.

The CCITT V.24/V.28 electrical specification states a minimum voltage output swing at a stated loading. Even though the specification itself does not state that an attached device may be powered from the interface, as long as the stated maximum loading is not exceeded, it is a benefit to be independent of external power. Where it is undesired to put further loading on the serial port or the serial port itself does not fully comply to the driver requirements stated in the specification, external power may be applied from an AC/DC adapter or batteries included in the host unit. If desired, an interface control signal may be used to control the power of the host unit 60, where one state is a low-power, standby condition and the other an active, full-power state.

A principal circuitry of the host unit 60 may be implemented as follows:

The host unit 60 is designed to be connected to a standard V.24/V.28 serial port, where the voltage levels of outputs RTS and DTR are programmed by the interface software to be at a high level, thereby providing a positive supply voltage for the circuit elements. The Receive Data Input (RxD) has mark level at a negative level, thereby providing a negative supply for a level shifter 98. Additional tank and smoothing capacitors 82, 96 are provided and may be supplemented with a voltage-stabilizing element, such as a parallel zener diode (not shown).

A level shifter 84 provides shifting of input voltages to the host unit, and provides a logic high output when the input is at mark level, i.e. inactive. An oscillator schmitt-trigger NAND circuit 86 will then oscillate at a frequency primarily set by a LC resonant circuit comprising a resistor 90, an inductance 92, and a capacitor 94 present on the output of schmitt-trigger 88. This resonant circuit provides a carrier output on conducting area 42b. By the resistive feedback this design provides for an automatic tuning of the resonant circuit to operate at its peak output amplitude, relatively independent of the complex impedance loading of 42b. By selecting a CMOS/HCMOS schmitt-trigger 88, the value of resistive feedback can be kept high to reduce the loading of the resonant circuit. Further benefits of using HCMOS devices includes low operating power, low output impedance, rail-to-rail output swing and input protection diodes, thereby providing a high output swing of the resonant circuit with a minimum of design complexity.

When a space level is present on the input of level shifter 84, a logic low output disables the oscillator function, so that the output of the resonant circuit fades and a DC level is present on terminal 42b. When a serial data stream is received on the input of level shifter 84, the output of the resonant circuit will provide a pulse-modulated carrier, which is then capacitively coupled over to the portable device.

The guest unit 10 has a high input impedance and is further explained below in the detailed description of the transaction device interface.

Accordingly, when capacitive interface plates 40 and 42/44 are placed in close proximity to the corresponding plates 40b, 42b and 44b, capacitors are formed by plates 40–40b, 42–42b and 44–44b. The actual capacitor values are primarily given by the plate size, the distance between the plates and the type of dielectric material(s) present between them.

The design where plates 42 and 44 are connected together implies a reduced stray capacitive coupling between plates 42b and 44b. Another benefit is that the portable device is symmetric, i.e. it can be rotated in steps of 180° without loss of functionality.

A first closed capacitive loop is formed by following the output of the resonant circuit in the host unit 60, via plates 42b–42 to the guest unit 10, through a rectifier bridge 120 having four diodes 122, through the parallel impedance circuit 114 including a capacitor 116 and a resistor 118, and back to ground in the host unit 60 via plates 40–40b.

A second closed capacitive loop is formed by following the output of the resonant circuit in the host unit 60, via plates 42b–42, 44–44b and via the input diode 106 and resistor 102 down to ground in the host unit 60.

When the oscillator circuit 16 in the host unit 10 is enabled, the first capacitive loop induces a voltage on terminal RX in the guest unit 10. By an optional peak-hold diode and tank capacitor (not shown), a low-current circuitry can then be powered in the guest unit 10, without severely affecting the signal transfer between the host unit 60 and the guest unit 10.

When the oscillator 88 is modulated by a data stream from the transaction terminal 68, a corresponding demodulated output is formed at terminal RX in the guest unit 10. By an optional voltage limiter and schmitt-trigger (not shown) on RX, a clean, demodulated signal can be directly processed by the integrated circuit 50 in the guest unit 10.

The guest unit 10 further comprises a transistor 112 connected in parallell with the impedance circuit 114. Digital data information can be transmitted back from the guest unit 10 to the host unit 60 by controlling the transistor 112 from a TX terminal in the guest unit 10. When the transistor 112 conducts, the input on plate 42 is effectively shorted to ground via plates 40–40b, thereby attenuating the voltage on plate 44 coupled to plate 44b. The quiescent coupling of the carrier filtered in the input network connected to the level shifter 98 in the host unit 60 is then attenuated. A properly selected threshold value of the input to level shifter 98 together with a hysteresis perform the demodulation of the information transferred from the guest unit 10 to the transaction terminal 68.

In the case of power transfer from the host unit 60 to the guest unit 10, it is an undesired effect that NRZ(Non-Return to Zero)-modulated data disable the voltage on the RX terminal in the guest unit. By applying a different modulation scheme well known in the art, such as PPI, FM or Manchester, the off-time can be reduced, thereby enabling a more continuous voltage in the guest unit 10.

This preferred embodiment has an inexpensive, easy to implement, self-tuned design with relaxed requirements of the reactive components. Components having a relatively poor tolerance of about ±10% of ideal values are usable in the system and are widely available at a low cost. The capacitive loading formed by the guest unit 10 as well as different stray capacitances just slightly moves the oscillator center frequency, without severely affecting the output amplitude.

As the host unit 60 operates at low power, it can be directly powered from the interface signals, thereby eliminating the need for external power, such as provided from an AC adapter or a set of batteries.

The guest unit operates at virtually zero quiescent current, without compromising the abilities to receive data at any time.

Alternatively to the embodiment described above, the card can be designed as a so called Smart Card for communicating data galvanically, i.e. via conductor patches exposed on the front face of the card (not shown). In that case, and also alternatively in the preferred embodiment described above, the electric energy can be stored in a thin-film battery forming a layer in the card (not shown). A card having such a self-contained energy source allows the holder to enter the PIN on his own, with less danger of revealing the PIN to others, before the card is placed on the card reader. If the transaction device according to the invention is shaped as a thicker credit-card sized calculator, it can of course have a small conventional cell battery as the electric energy source.

The IC 50 has data processing capabilities to perform a non-reversible transformation using a non-linear function transformation, or hash function, $$y=h(x)$$

which fulfils the following characteristics:

The output has a fixed output length for any input value of x.

There is no inverse, i.e. x cannot be calculated from a given value of y.

Be simple to calculate in terms of processing power and able to be evaluated by basic integer arithmetics and logical functions, including table lookup.

A device according to the invention is intended to be used in communication with the SP 72 as follows:

The media between the SP 72 and the TT 68 as well as between the TT 68 and the card 10 is considered to be insecure and all information transmitted in any direction can be intercepted and read in clear text by anyone at any time. The embossed card number is considered to have no relationship with an optional credit card number or any other information that may be useful by when intercepted by an alien.

The SP 72 can issue a Transaction Identifier (TID) of a considerable length to the TT 68. The TIDs are issued in a random way that the likelihood of two identical numbers being sent during the lifetime of one single card is extremely small or must never occur at all.

The card contains a card identity (CID) stored in the IC 50, unique to the cardholder. The CID is considered to be public and may be printed on the card 10 since it is not vulnerable and usable for performing a transaction without the card itself. The CID must have no link to an optional credit card number, if it is embossed on the card and recorded in the magnetic strip or CR 60. The CID can be automatically read from the card at any time by the magnetic strip or CR 60.

If desired, the card can provide a signal to the TT 68 for each pressed key on the keyboard 14 to give an audible and/or visible feedback to the user. Said feedback signal has no relation to the key position pressed.

The secret key (SK) stored in the IC 50 can by no means be retrieved from the card in any form and is programmed one time only by the card issuer. Software and/or hardware means prevents readout and altering of the secret key.

As mentioned previously, the card contains a stored Personal Identification Number code (PIN) stored in the IC 50. Said PIN can by no means be retrieved from the card in any form.

The card includes data processing capabilities to perform a non-reversible transformation using a single-use code from the SP via the TT 68 supplied TID and transmit it back to the SP 72 via the TT. Since two identical TIDs should never occur during the lifetime of the card, an alien system cannot perform playback of a recorded response, to thereby allow a fraudulent transaction in the case a previous response is recorded.

To identify a card, the following steps are performed:
1. The TT requests the CID from the card.
2. The card transfers the CID back to the TT. Depending on application, the CID may be transferred back to the SP.

Optionally, the following features can be added, depending on application:

The TT can repetitively request a CID.

When a card is placed on the reader, the application in the TT automatically redirects the user to a preprogrammed application program or URL on the Internet.

Further information about the card can be requested from the SP.

To perform a secure transaction or perform an authentication that the cardholder is valid, the following general steps are performed:
1. The TT transmits the CID retrieved as above to the SP.
2. The SP issues a TID that is relayed over to the card via the TT.
3. The cardholder is prompted to enter the PIN.
4. A valid PIN unlocks SK and performs a hash transformation of the TID and transfers the result back to the SP via the TT.
5. The SP performs the same processing as performed in step 4 and compares the retrieved result. If the results match, the transaction is considered to be valid.

To perform another secure transaction, the steps are repeated from step 2.

To further enhance security, the following steps may be followed:

Only one transaction is allowed for each challenge TID received. Each new transaction has to be validated by a new TID.

A timeout is set after a challenge TID is received to the card. A timeout requires a new TID to be issued from the SP.

The card is preprogrammed to perform a preset number of transactions before it gets expired. The card is then permanently blocked for further use by non-reversibly altering a one-time blow memory cell.

The card is preprogrammed with a non-volatile counter, which permanently blocks the card if more than a preprogrammed number of invalid PINs are entered. Said counter is reset each time a valid PIN is entered.

Cards registered as lost and/or stolen gets permanently blocked for further use by the SP issuing a blocking TID, which permanently blocks the card for further use, and, if desired, alerts sales personnel. Said TID is programmed uniquely or randomly for each card and are known only by the SP and in the card, and appears as a normal TID for an alien who intercepts the TID.

Each card may be preprogrammed with a TID sequence map, randomly selected between issued cards, which map allows TIDs with a certain characteristic only. This sequence or scheme must be carefully selected not to cause any undesired effects in the non-linear transformation resulting in a statistically biased response pattern. If a received TID does not match to said scheme, the card immediately gets expired, thus increasing the likelihood of early detection and termination of an alien attempt to issue faked TIDs.

Each card may be programmed to use different transformation algorithms depending on a preprogrammed selection scheme detectable from the TID. The scheme may be preprogrammed into the card and be known only by the SP and in the card.

As mentioned previously, a first-time PIN-code can optionally be initialized by the cardholder. The PIN code can then not be altered and is thereafter known by the cardholder only, Since each response from the card requires a complete and validated PIN entry, it is assumed that an alien attempt to provide faked TIDs to the card in order to find out information by the secret key in the card will be unsuccessful. The enhanced security level of blocking the card after a preprogrammed number of transactions further strengthens this assumption.

A statistically proven selection of the key length, a non-linear transformation algorithm and the card expiry counter should make it possible to render this scheme to be unbreakable by all practical means. This further requires a carefully selected randomization scheme to be performed so that no detectable link exists between the CID and the SK or so that no biasing effects occur in the transformation process.

Optionally, the following features can be added, depending on application:

The card may contain a read/write memory area which can be used to store personal information in the card itself, i.e. Internet cookies, user profiles etc. This memory area can be either open to be read at any time or made to request unlocking by a valid PIN-code.

The cardholder may enter further transaction data on the card's keypad, such as transaction amount, available options, secret votes etc.

The CID together with different entries can also be arranged to automatically control a user application environment to connect to a predetermined location, such as an URL of the Internet, a certain home location of a mailbox account etc.

Other advantageous features of the transaction device are:

Simple design of reader allows home use, where a personal desktop or palmtop computer can be used as TT with simple Internet downloadable software.

Solid state, wireless and sealed design allows for a sealed TT without moving parts or slots.

No degradation due to water, moisture, corrosion, magnetic fields etc.

Capacitive coupling prevents wireless interception of information which is not the case with radio frequency cards available today.

Low power design of CI and card.

What is claimed is:

1. A method of identification and authentication of a holder of a mobile electronic transaction device in an electronic transaction process between a transaction service provider and a transaction terminal in communication via a computer network, said mobile transaction device comprising transceiver means for transmitting information to and receiving information from said transaction terminal, data input means, data processing means, data storage means having information stored therein including an externally accessible device identity, a non-retrievable reference user identification, and including a non-retrievable secret key to be processed by said processing means and used in communication with the service provider by said transceiver means over said network via the transaction terminal for validating a transaction, and means supplying electric energy to the device, said method comprising the following steps:

transmitting the device identity to the transaction terminal;

transmitting a challenge transaction identifier to the device;

said holder entering a user identification input using said input means;

said processing means determining an authenticity of said identification input by comparison with said reference user identification; and only on said identification input being determined as authentic: said processing means performing a cryptographic transformation of the transaction identifier using said secret key; and transmitting a response result of said cryptographic transformation to the service provider via said transaction terminal for validating said transaction.

2. The method of claim 1, comprising the holder entering said reference identification prior to a first time use of the transaction device.

3. The method of claim 1, comprising said transceiver means automatically communicating with the service provider on placing the device in close proximity to said transaction terminal.

4. A mobile electronic transaction device for identification and authentication of a holder of the device in an electronic transaction process between a transaction service provider and a transaction terminal in communication via a computer network, said mobile transaction device having contained therein:

transceiver means for transmitting information to and receiving information from said transaction terminal, data input means, data processing means, data storage means for storing information including an externally accessible device identity, a non-retrievable reference user identification, and including a non-retrievable secret key to be processed by said processing means and used in communication with the service provider by said transceiver means over said network via the transaction terminal for validating a transaction, and means supplying electric energy to the device;

wherein said transceiver means being adapted for transmitting the device identity to the transaction terminal and receiving a challenge transaction identifier from the service provider via the transaction terminal;

said processing means being adapted for determining an authenticity of a user identification input by comparison with said reference user identification, and for performing a cryptographic transformation of the transaction identifier using said secret key only on said identification input being determined as authentic; and said transceiver means also being adapted for transmitting a response result of said cryptographic transformation to the service provider via said transaction terminal for validating said transaction.

5. The device of claim 4, wherein said transceiver means comprises a first transceiver for communication with said service provider on placing the device in a proximity relationship to a second transceiver being part of said transaction terminal.

6. The device of claim 5, wherein said first and second transceivers forming respective first and second parts of an electric circuit, the first part being contained in the device and the second part being contained in the transaction terminal, said circuit being physically divided into said parts in an area defining a respective dielectricum of a plurality of capacitors connected in said circuit when said card is placed in said proximity relationship to the transaction terminal.

7. The device of claim 6, wherein said means supplying electric energy to the device is comprised in said first and second parts of said electric circuit.

8. The device of claim 4, wherein the device has a shape of a credit card.

* * * * *